United States Patent [19]
Pieterse et al.

[11] Patent Number: 5,714,741
[45] Date of Patent: Feb. 3, 1998

[54] DEVICE FOR TRANSPARENT INTERACTION BETWEEN AN IC CARD AND A REMOTE TERMINAL

[75] Inventors: Rob Pieterse, ZL Aerdenhout; Mark Albert Pors, KV Zoetermeer; Martin Klaas De Lange, NN Voorburg; Johan Van Tilburg, SR Zoetermeer, all of Netherlands

[73] Assignee: Koninklijke PTT Nederland N.V., Groningen, Netherlands

[21] Appl. No.: 638,243

[22] Filed: Apr. 26, 1996

Related U.S. Application Data

[60] Provisional application No. 60/000,035, Jan. 8, 1995.

[30] Foreign Application Priority Data

Apr. 28, 1995 [NL] Netherlands ............ 1000254
Jan. 17, 1996 [NL] Netherlands ............ 1002112

[51] Int. Cl.⁶ .................... G06F 17/60; G06K 5/00
[52] U.S. Cl. .................... 235/380; 235/379
[58] Field of Search ............ 235/385, 380, 235/379, 472, 384, 375; 364/704; 340/825.31, 825.32, 825.38

[56] References Cited

U.S. PATENT DOCUMENTS

| | | | |
|---|---|---|---|
| 4,882,474 | 11/1989 | Anderl et al. | 235/380 |
| 5,189,287 | 2/1993 | Parienti | 235/380 X |
| 5,208,446 | 5/1993 | Martinez | 235/380 |
| 5,221,838 | 6/1993 | Gutman et al. | 235/380 X |
| 5,247,578 | 9/1993 | Pailles et al. | 380/24 |
| 5,335,276 | 8/1994 | Thompson | 380/21 |
| 5,485,510 | 1/1996 | Colbert | 235/380 X |

FOREIGN PATENT DOCUMENTS

| | | |
|---|---|---|
| 0 451 288 | 10/1991 | European Pat. Off. . |
| 0 637 004 | 2/1995 | European Pat. Off. . |
| 62-043943 | 2/1987 | Japan . |
| WO 91/07042 | 5/1991 | WIPO . |
| WO 94/28498 | 12/1994 | WIPO . |
| WO 95/04328 | 2/1995 | WIPO . |

*Primary Examiner*—Donald T. Hajec
*Assistant Examiner*—Thien Minh Le
*Attorney, Agent, or Firm*—Michaelson & Wallace; Peter L. Michaelson; Michael P. Straub

[57] ABSTRACT

The invention provides a device (1) for providing a transparent exchange of commands and data between an IC card (11) and a remote terminal (42) via a communication network (41). The device (1) acoustically couples the IC card (11) with a telephone set (43). In order to speed up the exchange of data and commands, the device (1) preferably utilizes high level commands which represent several low level card commands. However, low level commands may also be transparently passed as a special high level command. The device (1) is inexpensive but allows an efficient use of IC cards for, e.g., payment and identification purposes.

21 Claims, 6 Drawing Sheets

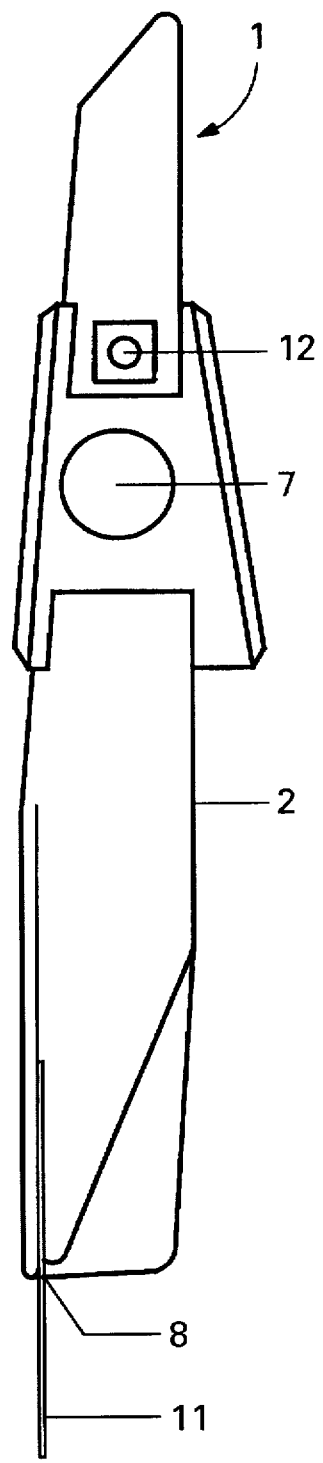
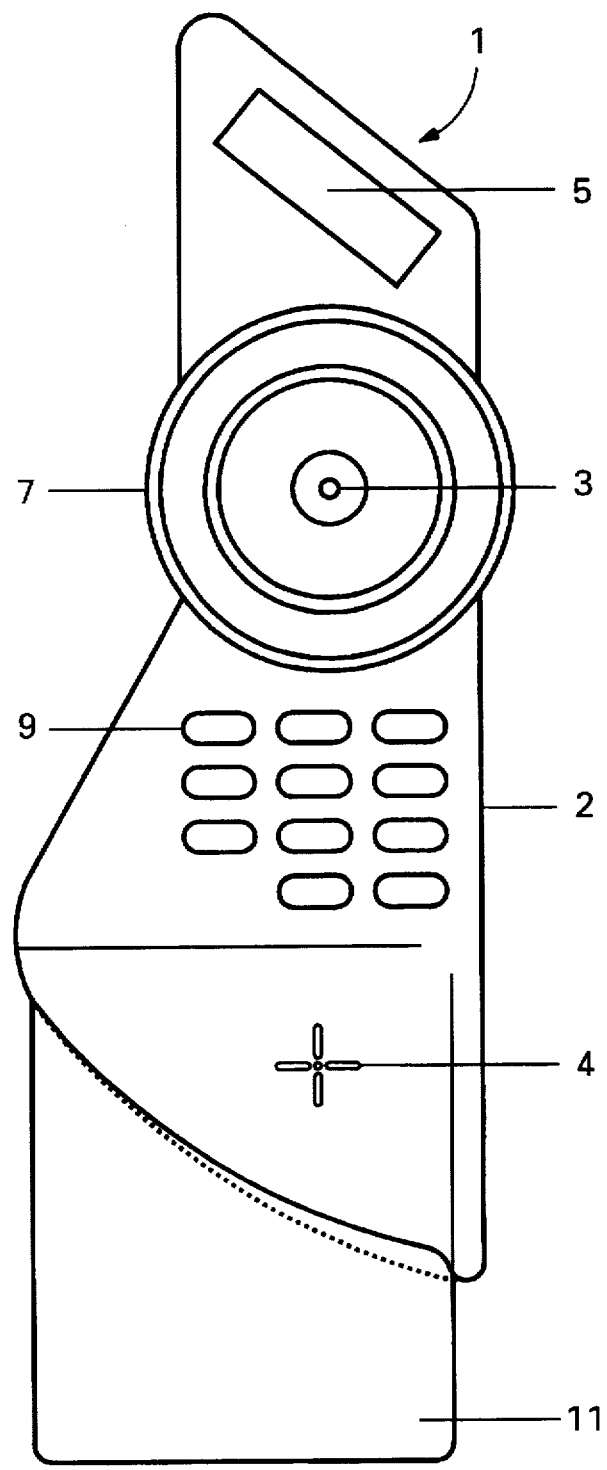
Fig. 1a
Fig. 1b

DEVICE FOR TRANSPARENT INTERACTION BETWEEN AN IC CARD AND A REMOTE TERMINAL

This application claims priority of U.S. provisional patent application assigned Ser. No. 60,000,035; filed on Jun. 8, 1995 and entitled "Device for User Verification Over a communication System, and also a System which said Device is Used".

BACKGROUND OF THE INVENTION

The invention relates to a device for interaction between an IC card and a remote terminal. More in particular, the invention relates to a device which enables a direct interaction between an IC card and a remote terminal, using a communication system.

Nowadays, there is an increasing demand for remote services. Thus through television various products and services are offered which consumers can order at home. Such services include "video on demand" (VOD), tele-shopping and tele-entertainment. Consumers want a prompt delivery of products ordered or a prompt access to entertainment services, such as video on demand. In order to prevent abuse of this kind of services, either an immediate payment should be made, or the identity of the user should be verified, before performing the service.

IC cards or smart cards are widely used today for effecting payments in e.g. public telephones (pay phones). An IC card contains an integrated circuit (IC) with a memory and, in more advanced cards, also a microprocessor. Such cards allow payments to be made by deducting an amount to be paid from a balance stored on the card. In advanced cards such payments are secured by protocols involving cryptographic processing of certain data and use of associated keys. In this respect, reference is made to e.g. published European patent application EP 0,637,004 and U.S. Pat. No. 5,247,578, which are herewith incorporated by reference in this text.

Advanced IC cards also allow the identity of the card to be established, e.g. by transmitting a (cryptographically processed) card identity number. If access to the card is protected by means of e.g. a secret personal identification number (PIN), the card may be employed for user verification, i.e. for securely establishing the identity of the user. Such a user verification is not only necessary when a prompt service is desired, but also when payment transactions without an instantaneous delivery of a service or product are remotely performed (e.g. tele-banking).

Presently, payment systems exist, such as the credit card systems, through which payment information is sent to a payment organization via a telephone set. For this kind of transactions, the telephone set concerned is especially adapted with a card reader and, optionally, with a keyboard. Such devices have the disadvantage that they are relatively expensive. It is not to be expected that large numbers of consumers will within the foreseeable future buy such a device.

Furthermore, it is known in practice to communicate, via a standard telephone set, a credit card number in an oral manner. This has the disadvantage that third parties (e.g. by intruding or eavesdropping on the telephone connection) can easily abuse the number.

Several devices for communicating with an IC card are known from the Prior Art. U.S. Pat. No. 5,189,287, for example, discloses a system for transmitting data. The system comprises portable units, each provided with a card slot for receiving a dual chip memory card in which data are stored, and optical and acoustical transceivers for exchanging information with special optical terminals and with remote systems via a telephone network, respectively. The units comprise processing means, such as a microprocessor, for processing data which may be manually entered using a keyboard.

Published International patent application WO 95/04328 also discloses a device for communicating with an IC card. This Prior Art device comprises a microcomputer and an associated operating system, arranged for running application programs. The device is arranged for the processing and storage of financial data, the processing comprising the cryptographic processing of the data.

Published International patent application WO 91/07042 discloses a portable automated teller machine. The device, which comprises a microprocessor, operates without the need for a direct connection to a telephone line and is thus basically a stand-alone unit.

Published European patent application EP 0,451,288 discloses a portable data collection and transmission device for use with an IC card. The device, which comprises an acoustic coupler to communicate via a telephone line, further comprises a memory for storing data. Stored data can thus be transmitted.

Published International patent application WO 94/28498 discloses a device for communicating with an IC card. The device does not have acoustic means for communicating with a telephone set but needs a seperate connection to a subscriber line.

These Prior Art devices are basically stand alone units, provided with a microprocessor or the like for processing data independently from a remote terminal or system.

SUMMARY OF THE INVENTION

An object of the invention is to eliminate abovementioned and other disadvantages of the prior art and to provide a device which permits a protected information exchange to be performed in a simple and inexpensive manner, especially for the purpose of remote user identification.

Another object of the invention is to provide a device for user verification over a communication system, particularly over a non-protected telecommunication system, such as the public telephone system.

A further object of the invention is to provide a device for performing, in a remote manner via a telephone connection, a secure user verification for the purpose of electronic services, such as electronic payment transactions.

A still further object of the invention is to provide a simple and inexpensive system for electronic payment transactions on the basis of communication means which already exist or are at least are not specifically equipped for user verification.

A yet further object of the invention is to provide a device for use in combination with a telephone set and an IC card, which device performs a more efficient exchange of secure messages.

To this end, the invention provides a device for exchanging data between an IC card and a remote terminal via a communication apparatus, the device comprising means for connecting with the IC card; means for acoustically transmitting information to the communication apparatus; means for acoustically receiving information from the communication apparatus; and control means, which means are mutually coupled for the purpose of exchanging information between the communication apparatus and the IC card, which device according to the invention is characterized in that it is arranged for the transparent transfer of data.

The present invention is based on the insight that for secure communication between an IC card and a remote system, use can effectively be made of the features of present day cards (smart cards). In effect, by utilizing the intelligence of the card, the intelligence of the device can substantially be dispensed with. By providing a transparent transfer of data, the device can be kept simple while the secure exchange of data between the IC card and the remote terminal is substantially left intact. By providing a transparent transfer device, secure and reliable end-to-end communication between the IC card and the remote terminal is made possible.

A preferred embodiment of the invention is also based on the further insight that the acoustic path between the transfer device and the telephone set is limited in speed, while secure use of IC cards involves the time-consuming exchange of a plurality of commands and other data between the IC card and the remote system. To solve this further problem, the device of the present invention is preferably arranged for communicating with the remote terminal on a first level and with the IC card on a second level, each level involving a different data rate. In this way, the transparent exchange of data can be adapted to the particular transmission path.

Preferably, in the device according to the invention a command of the first level comprises a single command of the second level. By retaining a one-to-one relationship between commands of the two levels, it is possible to pass a second level command as a first level command from the remote terminal to the device of the invention. Advantageously, however, a command of the first level can also represent one or more commands of the second level. In this way, the number of second level commands which need to be exchanged between the device and the remote terminal can be drastically reduced.

Furthermore, the invention provides a system for electronic payment transactions, comprising a telecommunication network, a service provider which is coupled to the network, which service provider is arranged for performing electronic payment orders, a communication apparatus which is also coupled to the network, an electronic IC card which is arranged for secured transactions, and a device for transparently passing data between the IC card and the communication device.

The invention is thus based on the understanding that only a coupling between an intelligent card (smart card) and a communication apparatus has to be set up in order to enable a safe remote card and/or user verification for services.

EXEMPLARY EMBODIMENTS

Hereinafter, the invention will be elucidated more in detail with reference to the Figures.

FIGS. 1A and 1B show side and top views, respectively, device in accordance with the invention;

Figure 3:
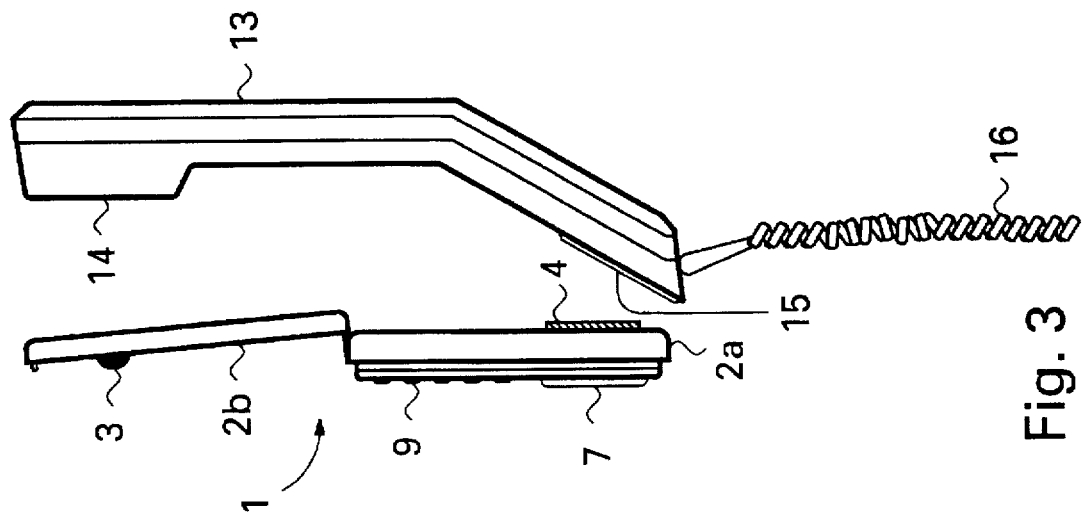
FIG. 3 shows the embodiment of FIG. 2 in a side view.

A preferred embodiment of a device in accordance with the invention is represented, by way of example, in FIGS. 1A and 1B. The devices 1 shown in FIGS. 1A and 1B comprise a housing 2, a microphone 3, a loudspeaker 4, a display 5, a control button 7, and keys 9. In the housing 2, a slot 8 has been recessed for inserting an IC card 11. The side view of the device 1 shows a connector 12 for (serial) data exchange with e.g. a computer.

The microphone 3 and the loudspeaker 4 constitute acoustic transducers 11 for converting electrical signals into acoustic signals (for instance DTMF tones) in order to establish an information exchange between IC card and a communication apparatus, such as a telephone set. Although they are shown as separate units in FIG. 1A and 1B, the microphone 3 and the loudspeaker 4 may be combined into a single unit.

The device 1 can be activated by the control button 7. However, the device may also be activated by an internal switch which acts upon the presence of a card 11, in which case the control button 7 may be omitted. The display 5, which preferably is constituted by an LCD display screen, serves as an indicator of the status of the device in order to facilitate its use. Alternatively, LEDs (not shown) or a tone and/or voice generator can be used for this purpose. In latter case, the loudspeaker 4 can advantageously be used for the purpose of indicating status. The keys 9 serve to enter data, such as a personal identification code (PIN) of the user of the IC card 11.

The housing 2 preferably has a such a form that, while using the device 1, it can be held easily in one hand. This criterion is met with the shape shown in FIGS. 1A and 1B, but could also be met with e.g. a round or oval shape.

Figure 2:
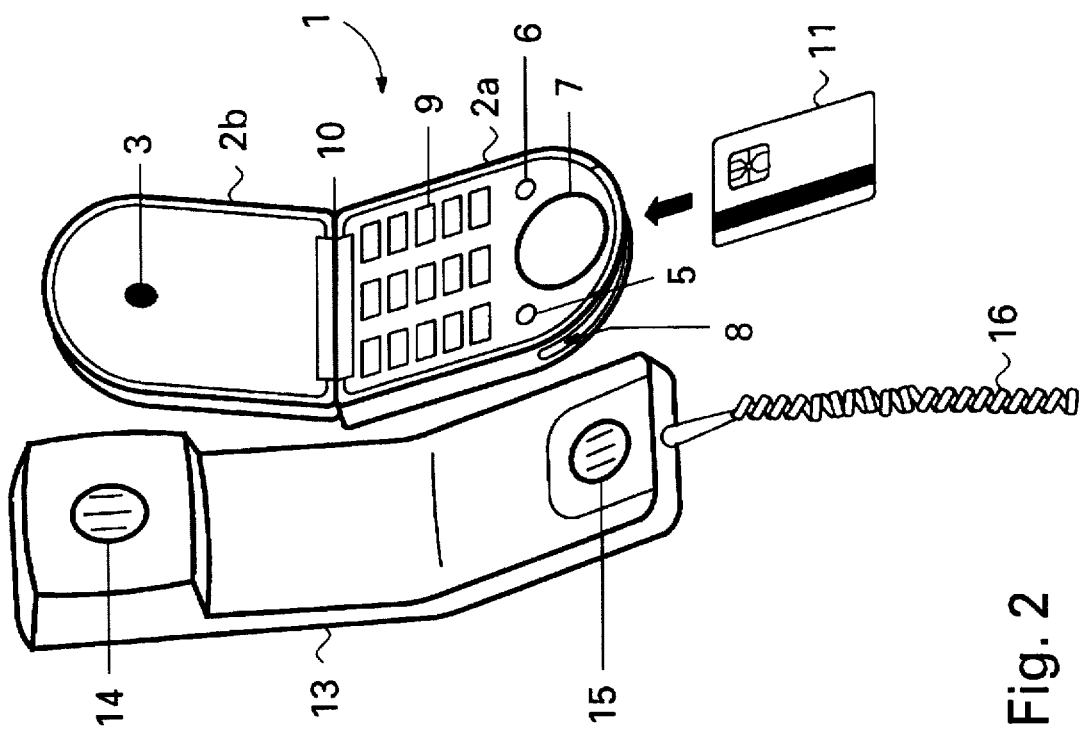
FIG. 2 shows in a perspective view a second embodiment of a device in accordance with the invention.

The alternative embodiment of the device 1, shown in FIGS. 2 and 3, in accordance with the invention comprises a housing 2, a microphone 3, a loudspeaker 4, a first LED 5, a second LED 6, and a control button 7. In the embodiment shown, the housing 2 is composed of two parts 2a and 2b, which are interconnected by means of a hinge 10. In the housing 2 (part 2a) a slot 8 is recessed for inserting an IC card 11. Furthermore, the device 1 comprises keys 9 for entering, inter alia, numerical data. The housing, which is composed of the two parts 2a and 2b, is preferably implemented in such manner that it can be folded and unfolded. In the folded state, inter alia, keys 9 and the microphone 3 are protected; in the unfolded state, the distance between microphone 3 and loudspeaker 4 is approximately as large as the distance between loudspeaker 14 and microphone 15 of the receiver 13 of a telephone set. Possibly, the hinge 10 can be realized in such a manner that when unfolding the housing, the device is automatically activated so that the control button 7 can be omitted.

The receiver or handset 13, shown in FIGS. 2 and 3, is provided with a loudspeaker 14 and a microphone 15. A cord 16 connects the receiver 13 to a communication apparatus, such as a telephone set (not shown).

The mode of operation and the use of device 1 will be further explained later with reference to FIGS. 4–7.

In FIG. 3, device 1 and receiver 13 of FIG. 2 are shown in a side view. As shown in FIG. 3, when the device 1 is used, the loudspeaker 4 is situated in the vicinity of the microphone 15 of the receiver 13. Moreover, the microphone 3 of the device 1 is then situated in the vicinity of the loudspeaker 14 of the receiver 13. For the protection of the microphone 3, it has been arranged in such manner that it is protected by the part 2b in folded state of the housing 2. This positioning at the "interior" in practice does not prove to pose a problem. Possibly, the microphone 3 can be arranged at the other side of part 2b. It is noted, that for the sake of clarity, the microphone has been shown spherical in FIG. 3; however, in practice a flat microphone can also be used.

The device in accordance with the invention can be realized as a device which can be held in one hand, as is shown in the FIGS. 1A, 1B, 2, and 3; however, it can also be realized as a "table-top version" on which a receiver of a telephone set can be placed. Furthermore, the device in accordance with the invention may be implemented as being integrated in or/and coupled to a telephone set or other communication device, such as a facsimile apparatus.

Figure 4:
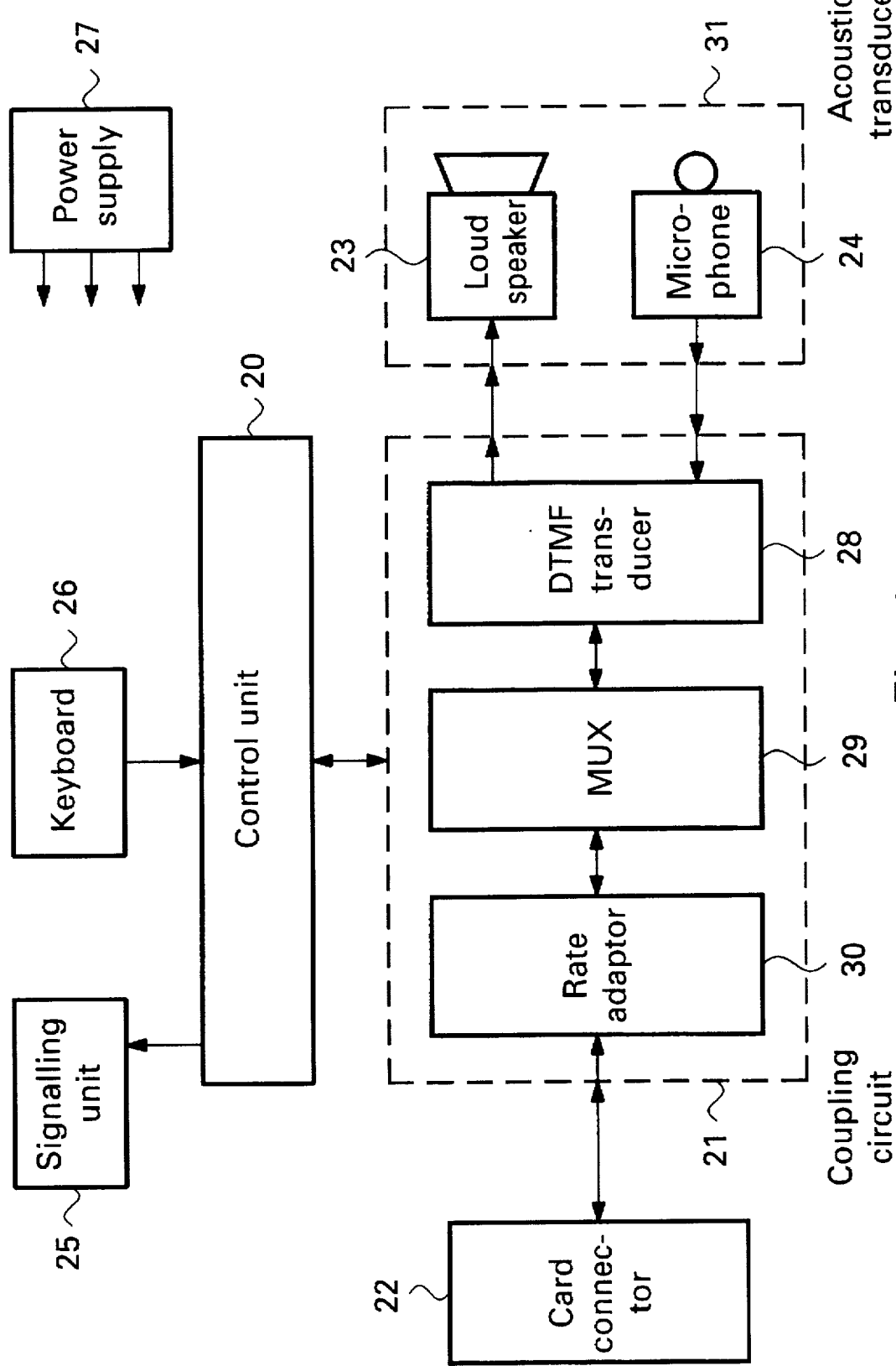
FIG. 4 shows diagrammatically the internal structure of a device in accordance with the invention.

The internal composition of the device (1 in the FIGS. 1A, 1B, 2, and 3) in accordance with the invention and diagrammatically shown by way of example in FIG. 4 comprises a control unit 20, a coupling circuit 21, a card connector 22, a loudspeaker 23, a microphone 24, a signalling unit (optional) 25, a keyboard (optional) 26, and a power supply 27. For the sake of clarity, the housing 2 is not shown in FIG. 4. The loudspeaker 23 and the microphone 24 may correspond to the microphone 3 and the loudspeaker 4 respectively of the FIGS. 1A, 1B, 2, and 3. The optional keyboard 26 may be constituted by the keys 9 in the FIGS. 1A, 1B, 2 and 3.

In the housing (2 in the FIGS. 1A, 1B, 2, and 3) of the device, a space has been recessed in which an IC card can be inserted via a slot (8 in the FIGS. 1A, 1B and 2). In this space, the card connector 22 has been arranged for providing a mechanical and electric contact with the IC card. Such a connector can be implemented in accordance with Standard ISO 7816. In case so-called contactless cards are used, the connector can advantageously be replaced by suitable (electromagnetic) means for exchanging information with the card, such as a transceiver provided with suitable antenna means.

The coupling circuit 21, which provides the coupling between, on the one hand, connector 22 and, on the other hand, loudspeaker 23 and microphone 24, for instance comprises a DTMF transducer 28, a multiplexer or fork circuit 29 and an (optional) rate adaptor 30. Under the influence of control unit 20, information is exchanged between the connector 22 (and the IC card connected thereto) and an (acoustic) transducer 31, which is constituted by the microphone 24 and the loudspeaker 23. The acoustic transducer 31 transforms electrical signals into acoustic signals and vice versa. Possibly, the transducer 31 can be implemented in such manner that it conducts a transduction between electric and optical signals, in which case the loudspeaker 23 would be replaced by, e.g., an infrared transmitter and the microphone 24, e.g., by an infrared receiver. Another possibility would be to replace the transducer 31 by a line interface which provides an (electric) coupling between the device and a communication network.

The signaling unit 25 attends to signaling the user, e.g. indicating the status of the device by means of, for example, the LEDs 5 and 6 shown in FIG. 2. Advantageously, the signalling unit 25 can be provided with a voice generator for producing spoken instructions to the user.

The power supply 27 is preferably formed by a battery, but can also comprise a coupling to the power supply of a telephone set. The device in accordance with the invention can be provided with a keyboard 26 (keys 9 in FIGS. 1B and 2) for entering a code. Said code may comprise a Personal Identification Number (PIN) or a telephone number or access code, respectively, for example of an institution for effecting payments. Telephone numbers and/or access numbers may also be entered via the keyboard and be stored in the device and/or the IC card. When ISDN is used (for example via the so-called SBus), the keyboard 26 may be used for entering access numbers. Possibly, the keyboard 26 can also be suited for entering non-numerical data (alpha numeric keyboard).

The device in accordance with the invention can be used in the following way. The user pushes the control button (7 in the FIGS. 1A, 1B, 2, and 3), upon which the device is activated. The first LED (5 in FIG. 2) blinks, in order to indicate that the device is active. At all times the device, and consequently the IC card, can be blocked or de-activated by depressing the control button again.

The user then places the device 1 near the receiver (13 in the FIGS. 2, 3, and 7) of the communication apparatus (e.g. a telephone set) and enters his identification code (for example a PIN) on the keyboard 26. If the device 1 is not provided with a keyboard, the code may be entered on the communication apparatus. A period of time can also be entered, for example a maximum time limit of the verification session or of using the service concerned. With the identification code, the IC card is activated. It should be understood that the identification code itself need not be transmitted to the communication apparatus, only to the IC card. This further enhances the security of the device.

Subsequently, the user dials the number (for example the telephone number) of the service or organization desired, by entering this number on the keyboard of device 1 or of the telephone set (43 in the FIG. 7). If the number is stored in the device or in the payment means, this number can be issued automatically. Then, the verification session between the service provider (service organization or institution) and the IC card is started.

In the first part of the session, the user places the microphone (3 in the FIGS. 1A, 1B, 2, and 3) of the device 1 near the loudspeaker (14 in FIGS. 2 and 3) of the telephone handset 13 in order to receive information. If this has proceeded well, the first LED (5 in FIG. 2) starts to light up permanently and the second LED (6 in FIG. 2) starts blinking in order to indicate to the user that the second part of the session can commence. To this end, the user places the loudspeaker (4 in the FIGS. 1A, 1B, 2, and 3) in the vicinity of the microphone (15 in the FIGS. 2 and 3) of the receiver (13 in the FIGS. 2 and 3). If transmitting information by the device 1 proved to be successful, the second LED (6 in FIG. 2) will start to light up permanently. This completes the transaction (e.g. user verification or payment). Preferably, the service provider or institution for effecting payments will give a return signal to the user via the device 1. When is session is completed, both LEDs will extinguish.

The above scenario is only given by way of example; it will be understood that many other scenarios are possible.

The device in accordance with the invention can be provided with means (known per se) for voice recognition. First, it is then possible to make the device 1 voice-controlled, so that pushing the control button and keys can be omitted. This is especially, but not exclusively, advantageous for ill-sighted persons or disabled persons. Second, it is possible to offer an additional user verification by means of voice verification, that is to say, to identify the speaker unambiguously on the basis of his voice. Possibly, entering a PIN code can then be omitted.

The information which is exchanged via the device 1 between the telephone set and the IC card, can comprise at least three kinds of information. First, identification or verification information for verifying the identity of the user. After all, before a payment can be charged to an account, the user identity must be established. The information exchanged may further comprise payment information. That is, in the case of debiting a card, information relating to the balance remaining on the card and the value which must possibly be written off the card. Furthermore, dialling information can be exchanged, or can at least be emitted to the telephone set by the device. Possibly, the telephone set can emit dialling information to the device for the purpose of later usage (requesting an access number of a payment organization). Said dialling information can for example be stored in the IC card.

As appears from the above, device 1 forms an interface between the telephone set and the IC card, transferring information in two directions. The facilities of the IC card (processor and memory with verification algorithm) may be used for performing a user verification and/or a card verification (which verification is preferably protected in a cryptographic manner). Since the built-in facilities of the IC card are utilized and the device basically only passes commands and/or data in a transparent manner, the device 1 can be very simple and therefore inexpensive. Furthermore, the device in accordance with the invention is interchangeable, that is to say, the device can be used by different persons in which each has his (her) own IC card.

The device 1 may be composed of commercially available components. The control unit 20 can be formed by a microprocessor and a memory. An additional memory (not shown in FIG. 4) may be provided for e.g. storing access codes and/or PIN codes. Preferably, the various electronic components, such as the control unit 20, the coupling circuit 21 and the signalling unit 25 are accommodated in a single application-specific integrated circuit (ASIC).

Figure 5:
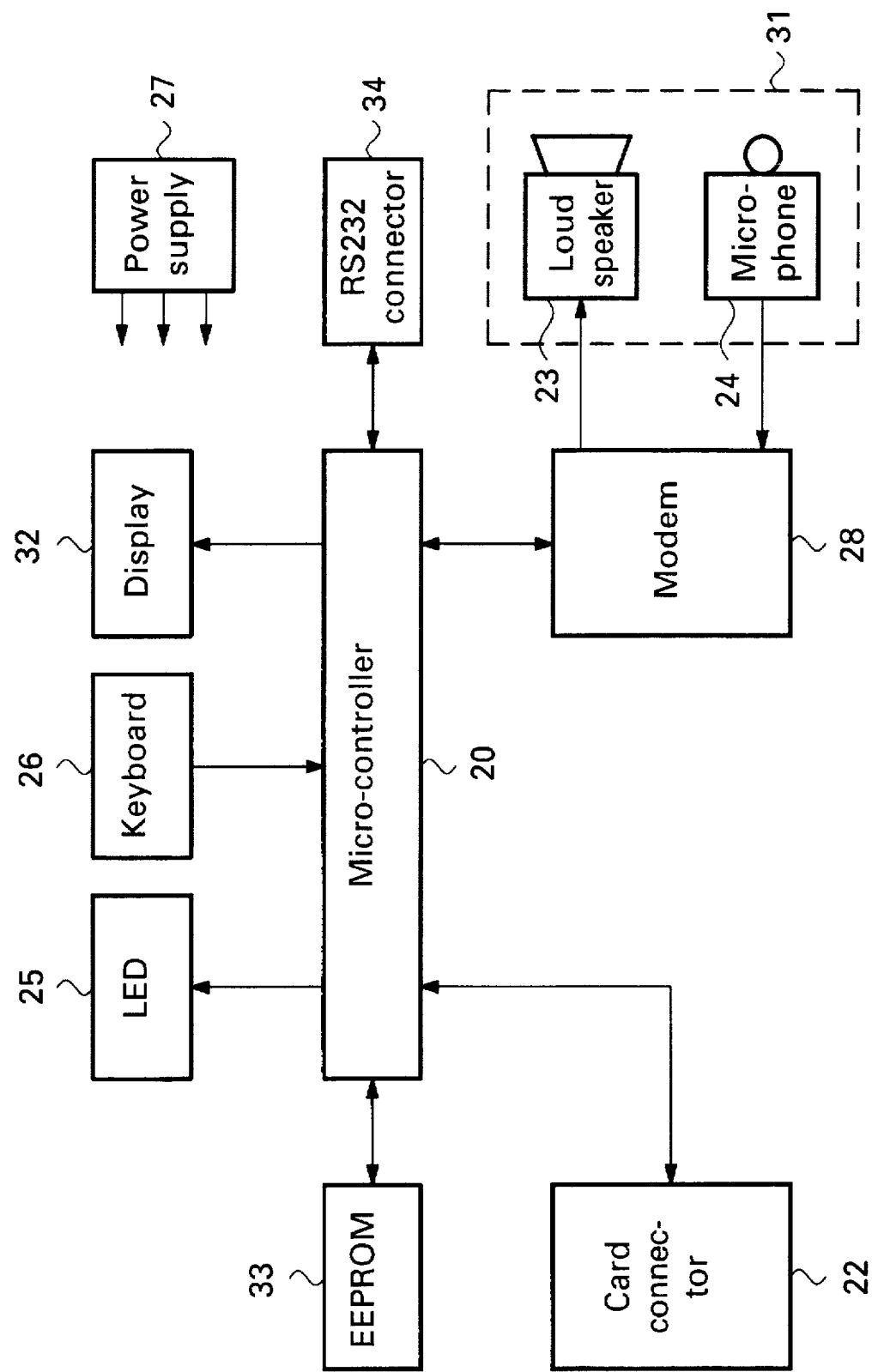
FIG. 5 shows diagrammatically an alternative internal structure of a device in accordance with the invention.

FIG. 5 shows an alternative internal arrangement of the device according to the invention. In the arrangement shown, the control unit 20 is constituted by a microcontroller, i.e. a microprocessor with a built-in memory and possibly additional circuits. As the micro-controller 20 preferably comprises input and output ports (UART), the multiplexer 29 and the rate adaptor 30 (shown in FIG. 4) may be omitted. The DTMF transducer 28, also shown in FIG. 4, has been replaced by a modem, as shown in FIG. 5. A display 32 is connected to the micro-controller 20. An erasable programmable memory (EPROM) 33, which may be constituted by an EEPROM or a so-called flash EPROM, serves to store suitable software of the micro-controller 20. Preferably, the device allows the software in the memory 33 to be upgraded, e.g. by loading new software from an IC card inserted into the device.

An (optional) serial connector 34 serves to provide a direct electrical connection, e.g. according to the RS232 protocol, with external devices, such as computers. This allows the device to be used for computer network applications, e.g. performing payments via the Internet. The (optional) signalling unit 25 may be constituted by one or more LEDs.

The control unit or micro-controller 20 serves primarily to pass card data (i.e. commands and card data proper) between the card connector 22 and the modem 28. Although the micro-controller 20 (and thus the transfer device 1) is basically transparent in that card data (i.e. card commands and card data proper) are merely passed through, the microcontroller preferably performs an adaption of the card data in order to increase the speed at which card data are exchanged. This will further be explained with reference to FIG. 6.

Figure 6:
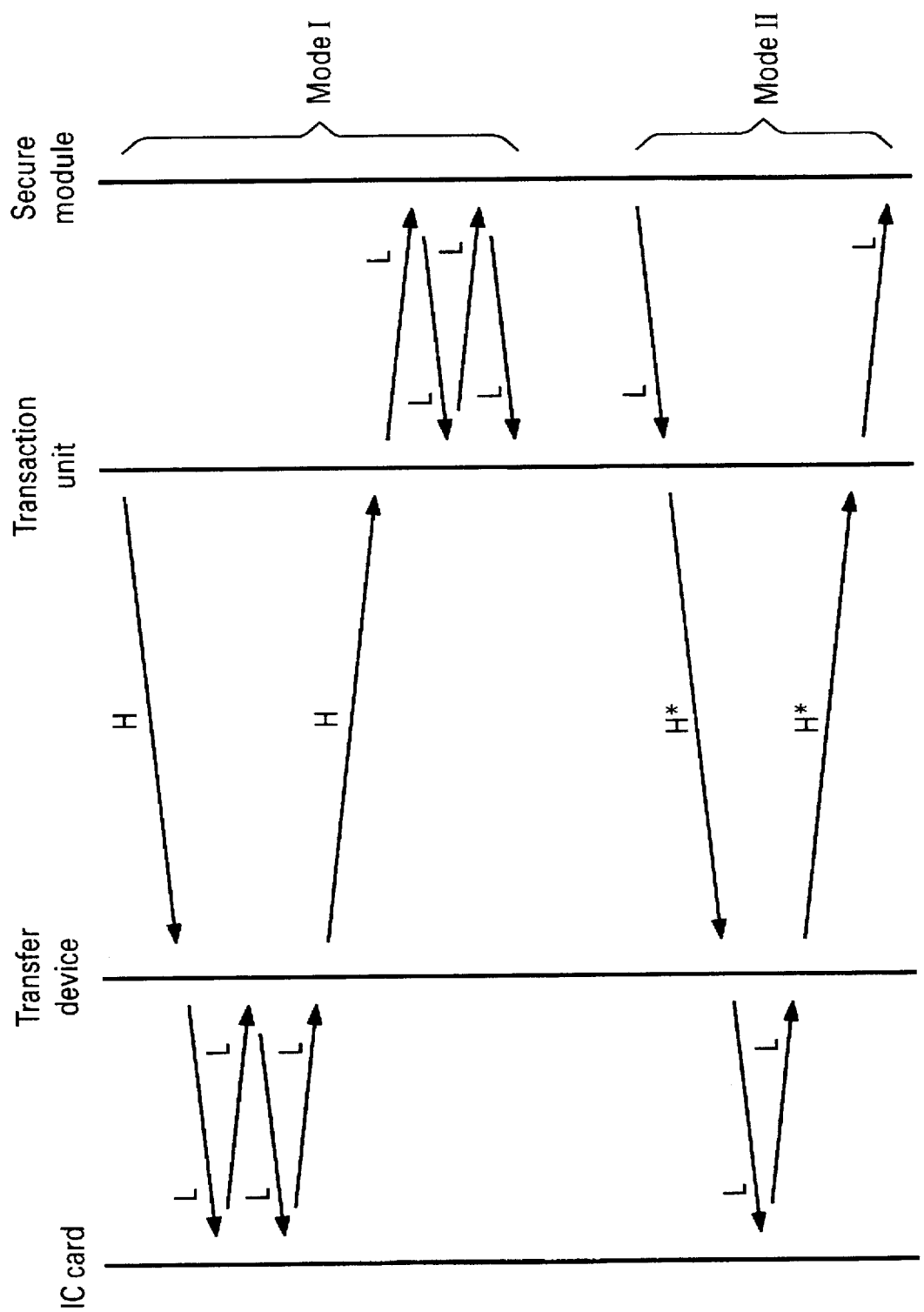
FIG. 6 shows diagrammatically the exchange of messages between the constituent parts of a remote payment system in accordance with the invention.

In FIG. 6, the exchange of card data (commands and data sent to the IC card and their responses) between an IC card on the one hand and a secure module of a transaction unit on the other hand is schematically represented. The IC card may correspond with the card 11 of FIGS. 1A, 1B, 2, 3 and 7, the transfer device may correspond with the device 1 of FIGS. 1A, 1B, 2 and 3, the transaction unit may be a computer or similar device incorporated in the service provider unit 42 of FIG. 7, and the secure module may correspond with the Secure Module (SM) 44 in FIG. 7.

In accordance with a further aspect of the present invention, a distinction is made between two levels of card commands exchange. Between the IC card and the transfer device, a low level exchange takes place: the actual card commands and card data are sent to and received from the card. As this exchange is performed using electrical signals within the transfer device 1, the exchange can have a high data rate. Between the transfer device and the transaction unit, however, an acoustic path is present (between the device 1 and the receiver 13). This section of the connection between IC card and secure module usually has a limited transmission speed. For this reason, in this section a high level exchange takes place in which several low level commands are grouped together and are replaced with a single high level command. In this way, the transmission time required for a transaction can be significantly reduced.

As is shown in FIG. 6, the transaction unit may issue a high level command (indicated by H). In response to the receipt of this single high level command, the transfer device exchanges several low level commands (indicated by L) with the IC card. The result of this exchange is sent by the transfer device to the transaction unit as a single high level command (H). Subsequently, this high level command results in the exchange of several low level commands (L) between the transaction unit and the secure module. Each high level command (H) thus represents a routine comprising a plurality (e.g. five or ten) low level commands (L). Preferably, the high level commands are optimized for efficiency by, e.g., having each commonly used routine represented by a single high level command.

Preferably, the transfer device supports two different modes of data exchange. In a first mode (indicated by Mode I in FIG. 6) the transfer device operates as described above: a high level command represents several low level commands. In a second mode (indicated by Mode II in FIG. 6) a single low level command (L) is sent as a high level command (H*) to the transfer device, which passes the command as a low level command to the IC card. The resulting low level command (L) produced by the card is again sent by the transfer device to the transaction unit as a high level command (H*), which subsequently converts the command back into a low level command (L). It will be understood that the high level commands H* merely convey low level commands (L). That is, the high level commands H* may e.g. consist of a low level command plus an appropriate header. In this way, low level commands may be transparently passed to the IC card while using the structure and/or data protocol of the high level commands. This transparent passing has the advantage that low level commands may be used for which no high level command is available, i.e. which cannot be grouped in an existing high level command. This is especially advantageous as the introduction of an IC card with one or more new commands does not necessitate the upgrade of the software of the transaction device.

Preferably, the transfer device, as well as the transaction unit, is capable of shifting back and forth between Mode I and Mode II, so that high level commands (H), each representing a number of low level commands may be interspersed with appropriate high level commands (H*), each merely conveying a single low level command.

Figure 7:
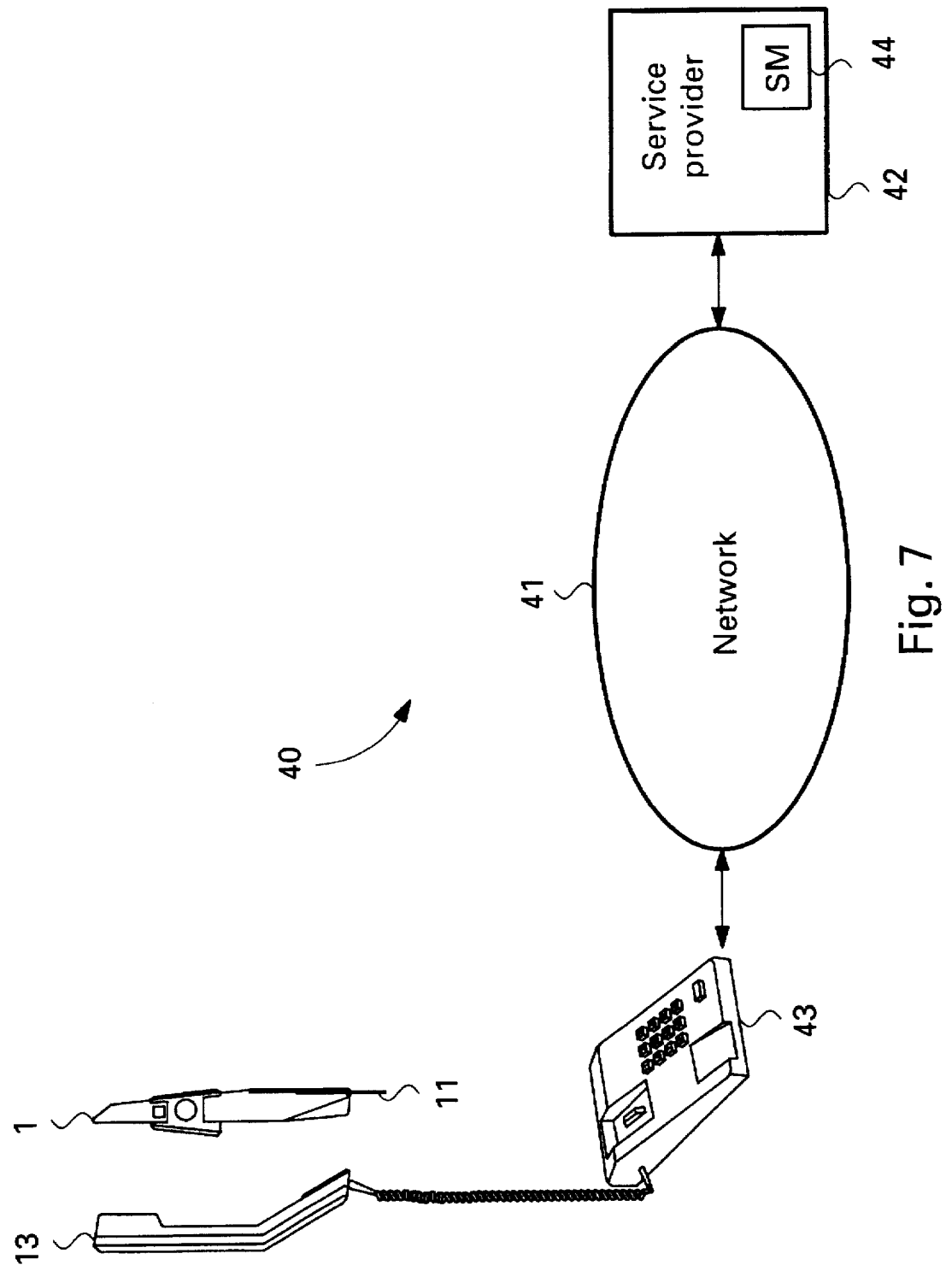
FIG. 7 shows diagrammatically an embodiment of a payment system in accordance with the invention.

The (payment) system 40, shown in FIG. 7, comprises a telecommunication system 41, which can comprise a telephone network. A service providing organization associated with service provider unit 42 is coupled to the telecommunication system 41. This organization 42 for example is a institution for effecting payments (such as a bank) which is arranged for paying in an electronic manner and therefore for executing verification procedures. The service provider may not only be a payment organization but also a service-providing organization in general (video center; pizza courier). The transaction unit 42 of the service provider comprises a secure module (SM) 44 in which payment data and cryptographic keys are securely stored. It will be understood that for the sake of clarity only a single service provider and accompanying unit 42 is shown in FIG. 7 but that in practice a plurality of service providers and their accompanying units 42 may be connected to the network 41.

A telephone set 43, which is also coupled to the telecommunication system 41, comprises a receiver 13. Via a device 1 in accordance with the invention (which corresponds with the device 1 of FIGS. 1A, 1B), an IC card 11 can, when being brought into contact with device 1 of FIGS. 1A, 1B exchange information with telephone set 43 and thus with the service provider unit 42 at a service provider organization. By means of exchanging verification information the identity and access authorization of the user of the IC card (verification card) 11 can be checked. Also, the authenticity of the card 11 may be verified in this manner.

It will be understood that whenever "telephone sets" are mentioned in this text, these must not only include fixed, but also mobile telephone and/or facsimile sets (in general: communication apparatus). Such a communication apparatus can also be formed by a computer (such as a PC) with a microphone. Furthermore, the term "electronic payment transactions" will primarily, but not exclusively, mean remote paying, in other words paying via a (tele) communication device. Said paying remotely can for example be conducted by a customer at home, or by a customer in his office. The invention is especially suitable in combination with television broadcasts with the possibility of immediately ordering and paying for advertised products.

The IC card mentioned in this text in general will be an electronic means for effecting payments, having an electronic circuit, arranged on a plastic substrate such as a so-called smart card or chip card. It will, however, be understood that the IC card need not have a cardlike shape. It is only essential, that the IC card can be used for performing a verification procedure, viz. the unambiguous determination of the authenticity and possibly also the identity of the card. Thus, the access authorization of the card and/of the user can be checked ("authentication"). Therefore, the term "means for effecting payment" must not only include an IC card, but for example also includes an electronic module having an electronic circuit suitable for verification purposes. The integrated circuit needed for verification (for example a so-called ASIC) can possibly also be arranged in the device in accordance with the invention, without a card or such substrate. This can, for example, be realised by making an opening in the housing (compare the slot 8 in FIG. 1A) in which an integrated circuit can be inserted in an un-detachable manner. This still offers the advantage that the device itself can be realized in a very simple and therefore inexpensive manner.

A financial transaction, executed with the assistance of the device in accordance with the invention possibly not only comprises a payment transaction but also a loading (revaluing) transaction, in which the balance of the IC card is increased instead of decreased. Furthermore, transactions are possible in which the device in accordance with the invention is only used for verification purposes, and the balance on the card is not decreased. It has to be noted, in this context, that the mentioned IC card or "payment card" actually need not comprise a balance of payments but can also be used only for verification purposes (verification card).

Apart from financial transactions, the device in accordance with the invention can also be used in other transactions in which an information exchange takes place between an IC card and a telecommunication system. Thus, with the device in accordance with the invention, an IC card, especially an identification or verification card, can be used with telephonic referenda and polls.

It will be understood by those skilled in the art that the invention is not limited to the embodiments represented and that various modifications and additions are possible without departing from the scope of the invention.

We claim:

1. Apparatus for use in conjunction with an IC card to provide transparent communication, through a communications facility, between the card and a remote terminal connected to the facility, the apparatus comprising:

circuitry adapted to interface to and for establishing communication with the IC card;

an acoustic interface for acoustically coupling to the communications facility and bidirectionally communicating information to and from the facility; and a control circuit connected to the circuitry and said acoustic interface so as to exchange the information, without altering data contents thereof, between the communication facility and the IC card, wherein the apparatus transparently transfers the information between the IC card and the communications facility such that the IC card communicates, transparently through the apparatus, with the remote terminal so as to facilitate a transaction, occurring through the facility, involving the IC card and the remote terminal.

2. The apparatus in claim 1 wherein, through the control circuit and the acoustic interface, first commands are exchanged between the apparatus and the remote terminal and, through the control circuit and the circuitry, second commands are exchanged between the apparatus and the IC card, wherein each of the first and second commands contains corresponding data and each of the first commands represents at least one of the second commands.

3. The apparatus in claim 2 in which one of the first commands comprises a single corresponding one of the second commands.

4. The apparatus in claim 2 in which another one of the first commands represents a plurality of corresponding ones of the second commands.

5. The apparatus in claim 1 further comprising a reprogrammable memory, connected to the control circuit, for storing control data.

6. The apparatus in claim 1 further comprising a keyboard, connected to the control circuit, for entering user data.

7. The apparatus in claim 6 wherein the user data comprises an identification code particular to a corresponding user.

8. The apparatus in claim 1 further comprising a housing, said housing containing said circuitry, acoustic interface and said control circuit, wherein said housing is sized for hand-held use.

9. The apparatus in claim 1 further comprising a serial port, connected to the control circuit, through which communication can transparently occur between the IC card and a device connected to the port.

10. A system for effectuating electronic payment transactions comprising:
   a telecommunications network;
   a remote terminal, coupled to the network and associated with a service provider, for performing an electronic payment transaction;
   a communications device coupled to the network;
   an electronic IC card capable of initiating secured transactions; and
   apparatus, communicatively interposed between said IC card and the communications device, for transparently exchanging information between the IC card and the communications device without altering data contents of the information so as to facilitate the payment transaction, occurring through said network, between the IC card and the remote terminal.

11. The system in claim 10 wherein the apparatus comprises:
   circuitry adapted to interface to and for establishing communication with the IC card;
   an acoustic interface for acoustically coupling to the communications device and bidirectionally communicating information to and from the device; and
   a control circuit connected to the circuitry and said acoustic interface so as to exchange the information, without altering data contents thereof, between the communication device and the IC card, wherein the apparatus transparently transfers the information between the IC card and the communications device such that the IC card communicates, transparently through the apparatus, with the remote terminal so as to facilitate a transaction, occurring through the network, involving the IC card and the remote terminal.

12. The system in claim 11 wherein, through the control circuit and the acoustic interface, first commands are exchanged between the apparatus and the remote terminal and, through the control circuit and the circuitry, second commands are exchanged between the apparatus and the IC card, wherein each of the first and second commands contain corresponding data and each of the first commands represents at least one of the second commands.

13. The system in claim 12 in which one of the first commands comprises a single corresponding one of the second commands.

14. The system in claim 12 in which another one of the first commands represents a plurality of corresponding ones of the second commands.

15. The system in claim 10 wherein first commands are exchanged between the apparatus and the remote terminal and second commands are exchanged between the apparatus and the IC card, wherein each of the first and second commands contains corresponding data and each of the first commands represents at least one of the second commands.

16. The system in claim 15 in which one of the first commands comprises a single corresponding one of the second commands.

17. The system in claim 15 in which another one of the first commands represents a plurality of corresponding ones of the second commands.

18. Apparatus for performing a financial transaction through a communications facility comprising:
   an electronic IC card capable of initiating the financial transaction; and
   a device, for use in conjunction with the IC card to provide transparent communication, through the communications facility, between the card and a remote terminal connected to the facility, the device having:
     circuitry adapted to interface to and for establishing communication with the IC card;
     an acoustic interface for acoustically coupling to the communications facility and bidirectionally communicating information to and from the facility; and
     a control circuit connected to the circuitry and said acoustic interface so as to exchange the information, without altering data contents thereof, between the communication facility and the IC card, wherein the apparatus transparently transfers the information between the IC card and the communications facility such that the IC card communicates, transparently through the device, with the remote terminal so as to facilitate the transaction, occurring through the facility, involving the IC card and the remote terminal.

19. The apparatus in claim 18 wherein, through the control circuit and the acoustic interface, first commands are exchanged between the device and the remote terminal and, through the control circuit and the circuitry, second commands are exchanged between the device and the IC card, wherein each of the first and second commands contains corresponding data and each of the first commands represents at least one of the second commands.

20. The apparatus in claim 19 in which one of the first commands comprises a single corresponding one of the second commands.

21. The apparatus in claim 19 in which another one of the first commands represents a plurality of corresponding ones of the second commands.

* * * * *